US012747080B1

(12) United States Patent
Wang et al.

(10) Patent No.: US 12,747,080 B1
(45) Date of Patent: Sep. 29, 2026

(54) MINIMUM PACKAGING VOLUME STRUCTURE AND PACKAGING METHOD FOR DUAL-TANK PET WATER DISPENSER

(71) Applicant: Shenzhen Qianhai Runway Technology Co., LTD., Shenzhen (CN)

(72) Inventors: Jing Wang, Shenzhen (CN); Haobo Chen, Shenzhen (CN); Zhenqiang He, Shenzhen (CN)

(73) Assignee: Shenzhen Qianhai Runway Technology Co., LTD., Shenzhen (CN)

( * ) Notice: Subject to any disclaimer, the term of this patent is extended or adjusted under 35 U.S.C. 154(b) by 0 days.

(21) Appl. No.: 19/530,350

(22) Filed: Feb. 5, 2026

(51) Int. Cl.

| | |
|---|---|
| ***B65D 77/06*** | (2006.01) |
| ***B65B 5/10*** | (2006.01) |
| ***B65D 85/68*** | (2006.01) |
| *A01K 7/02* | (2006.01) |
| *B01D 39/04* | (2006.01) |

(52) U.S. Cl.
CPC ................ *B65D 77/06* (2013.01); *B65B 5/10* (2013.01); *B65D 85/68* (2013.01); *A01K 7/025* (2013.01); *B01D 39/04* (2013.01); *B65D 2585/6845* (2013.01)

(58) Field of Classification Search
CPC ............ B65D 77/06; B65D 85/68; B65B 5/10
See application file for complete search history.

(56) References Cited

FOREIGN PATENT DOCUMENTS

| | | | |
|---|---|---|---|
| CN | 209897950 U | * | 1/2020 |
| CN | 215302257 U | * | 12/2021 |
| CN | 219741531 U | * | 9/2023 |

OTHER PUBLICATIONS

CN-209897950-U Translation (Year: 2020).*
CN-215302257-U Translation (Year: 2021).*
CN-219741531-U Translation (Year: 2023).*

* cited by examiner

*Primary Examiner* — Kimberly S Berona
*Assistant Examiner* — Steven J Shur
(74) *Attorney, Agent, or Firm* — Nitin Kaushik

(57) ABSTRACT

Provided in the present disclosure are a minimum packaging volume structure and a packaging method for a dual-tank pet water dispenser. The minimum packaging volume structure includes: a circulating water tank, where the circulating water tank defines a first water storage chamber having a first upper opening, and a detachable water circulation system is disposed in the first water storage chamber; and a purified water tank, configured to supply water to the circulating water tank, where the purified water tank is accommodated in the first water storage chamber in a packaged state. The present disclosure effectively solves the problems of large packaging volume, high transportation and storage costs, and low packaging efficiency in an existing dual-tank pet water dispenser.

9 Claims, 8 Drawing Sheets

MINIMUM PACKAGING VOLUME STRUCTURE AND PACKAGING METHOD FOR DUAL-TANK PET WATER DISPENSER

TECHNICAL FIELD

The present disclosure relates to the technical field of packaging for pet supplies, and specifically to a minimum packaging volume structure and a packaging method for a dual-tank pet water dispenser.

BACKGROUND

With the popularization of pet keeping, the drinking water needs of medium and large dogs have received increasing attention. Dual-tank pet water dispensers, featuring large capacity, clean-dirty separation, and automatic water refilling, have gradually become mainstream products in the market. Such products typically include two independent tanks, namely a circulating water tank and a purified water tank, and a plurality of loose components such as water pumps, filter cartridges, water pipes, and adapters, resulting in a relatively complex structure and a large number of components.

In the prior art, dual-tank pet water dispensers are often packaged dispersedly, that is, a circulating water tank, a purified water tank, and various components are respectively wrapped with packaging materials and then placed together into a large outer packaging box. This packaging method has the following problems:

1. Large packaging volume: since the various components are placed dispersedly, the outer packaging box needs to reserve sufficient space to accommodate all the components, resulting in excessive packaging dimensions, occupying more transportation capacity during shipping, and leading to high logistics costs.

2. High storage costs: the large packaging volume requires substantial warehouse space for product storage, thereby increasing storage costs.

3. Low packaging efficiency: dispersed packaging requires each component to be individually wrapped and placed, making the operation process cumbersome and time-consuming.

4. Poor protective effect: when the components are placed dispersedly, collisions and displacements are likely to occur during transportation, resulting in product damage.

Therefore, it is urgently necessary to design a packaging structure and method for a dual-tank pet water dispenser that can achieve the minimum packaging volume, simplify the packaging process, reduce the costs, and ensure the protective effect.

SUMMARY

To solve the problems of large packaging volume, high transportation and storage costs, and low packaging efficiency in an existing dual-tank pet water dispenser, the present disclosure provides a minimum packaging volume structure and a packaging method for a dual-tank pet water dispenser.

The technical solutions of the present disclosure are as follows:

In a first aspect, the present disclosure provides a minimum packaging volume structure for a dual-tank pet water dispenser, including: a circulating water tank, where the circulating water tank defines a first water storage chamber having a first upper opening, and a detachable water circulation system is disposed in the first water storage chamber; and a purified water tank, configured to supply water to the circulating water tank, where the purified water tank is accommodated in the first water storage chamber in a packaged state.

As a preferred solution of the present disclosure, the water circulation system includes a water tray, a filter cartridge tray, a first water pump, and a first water supply pipe that are independently detachable, the purified water tank defines a second water storage chamber having a second upper opening, the second upper opening is covered by an upper cover, one side of the upper cover is provided with a detachable power supply device, and the purified water tank is capable of cooperating with a second water pump, a control board, and a water outlet structure disposed in the upper cover, and a water shortage sensor integrated with the first water pump to form an automatic water refilling system of the circulating water tank;

in the packaged state, the water tray, the first water pump, the first water supply pipe, and the power supply device are accommodated in the second water storage chamber, and the second upper opening is covered by the upper cover to form a purified water tank sealing structure; and the purified water tank sealing structure and the filter cartridge tray are accommodated in the first water storage chamber.

As a preferred solution of the present disclosure, in the packaged state, a filter cartridge and filter cotton that match the filter cartridge tray are both accommodated in the second water storage chamber.

As a preferred solution of the present disclosure, in the packaged state, one end of the first water supply pipe is connected to a water outlet of the first water pump, and then the first water supply pipe, together with the power supply device and the filter cotton, is packaged in a first packaging bag to form a first packaged assembly; the filter cartridge is individually packaged in a second packaging bag to form a second packaged assembly; the first packaged assembly, the second packaged assembly, and the water tray are together packaged in a third packaging bag to form a third packaged assembly; and the third packaged assembly is accommodated in the second water storage chamber.

As a preferred solution of the present disclosure, in the packaged state, the filter cartridge tray is individually packaged in a fourth packaging bag to form a fourth packaged assembly; the purified water tank sealing structure is individually packaged in a fifth packaging bag to form a fifth packaged assembly; and the fourth packaged assembly and the fifth packaged assembly are accommodated in the first water storage chamber to form a packaged combination structure.

As a preferred solution of the present disclosure, in the packaged state, the packaged combination structure is packaged in a sixth packaging bag to form a sixth packaged assembly; and the sixth packaged assembly is packaged in an outer packaging box to form a complete packaging structure.

As a preferred solution of the present disclosure, in the packaged state, the purified water tank sealing structure is longitudinally accommodated in a front area inside the first water storage chamber, and the filter cartridge tray is longitudinally accommodated in a rear area inside the first water storage chamber, such that the purified water tank sealing structure and the filter cartridge tray are arranged in a compact side-by-side layout in the first water storage chamber.

In a second aspect, the present disclosure provides a packaging method for a dual-tank pet water dispenser, applied to the minimum packaging volume structure for a dual-tank pet water dispenser according to any one of solutions above, and including the following steps:

step S1: placing a water tray, a first water pump, a first water supply pipe, and a power supply device together into a second water storage chamber of a purified water tank, and closing an upper cover to form a purified water tank sealing structure; and step S2: placing the purified water tank sealing structure and a filter cartridge tray together into a first water storage chamber of a circulating water tank to form a packaged combination structure.

As a preferred solution of the present disclosure, step S1 specifically includes the following sub-steps:

step S11: connecting one end of a second water supply pipe to a water inlet of a second water pump located at a bottom of the upper cover;

step S12: after connecting one end of the first water supply pipe to a water outlet of the first water pump, packaging the first water supply pipe together with the power supply device and filter cotton matching the filter cartridge tray in a first packaging bag to form a first packaged assembly;

step S13: individually packaging a filter cartridge matching the filter cartridge tray in a second packaging bag to form a second packaged assembly;

step S14: packaging the first packaged assembly, the second packaged assembly, and the water tray together in a third packaging bag to form a third packaged assembly; and step S15: accommodating the third packaged assembly in the second water storage chamber, and closing the upper cover to form the purified water tank sealing structure.

As a preferred solution of the present disclosure, step S2 specifically includes the following sub-steps:

step S21: individually packaging the filter cartridge tray in a fourth packaging bag to form a fourth packaged assembly;

step S22: individually packaging the purified water tank sealing structure in a fifth packaging bag to form a fifth packaged assembly;

step S23: placing the fourth packaged assembly and the fifth packaged assembly together into the first water storage chamber to form the packaged combination structure;

step S24: packaging the packaged combination structure in a sixth packaging bag to form a sixth packaged assembly; and step S25: packaging the sixth packaged assembly in an outer packaging box to form a complete packaging structure.

Compared with the prior art, the present disclosure has the following beneficial effects:

According to the present disclosure, through an innovative nested packaging design, the purified water tank having a small size is accommodated in the circulating water tank having a large size, making full use of an internal space of the circulating water tank; moreover, an internal space of the purified water tank can also be fully utilized to accommodate small components of the water circulation system and the small-sized power supply device in the purified water tank, greatly reducing a packaging volume. Only one outer packaging box matching the circulating water tank in volume is required to complete packaging, significantly reducing transportation and storage costs.

BRIEF DESCRIPTION OF DRAWINGS

To more clearly illustrate the technical solutions in the embodiments of the present disclosure, the accompanying drawings that need to be used in the description of the embodiments or the prior art will be briefly introduced below. Apparently, the accompanying drawings in the description below merely illustrate some embodiments of the present disclosure. Those of ordinary skill in the art may also derive other accompanying drawings from these accompanying drawings without creative efforts.

In the drawings.

Figure 1:
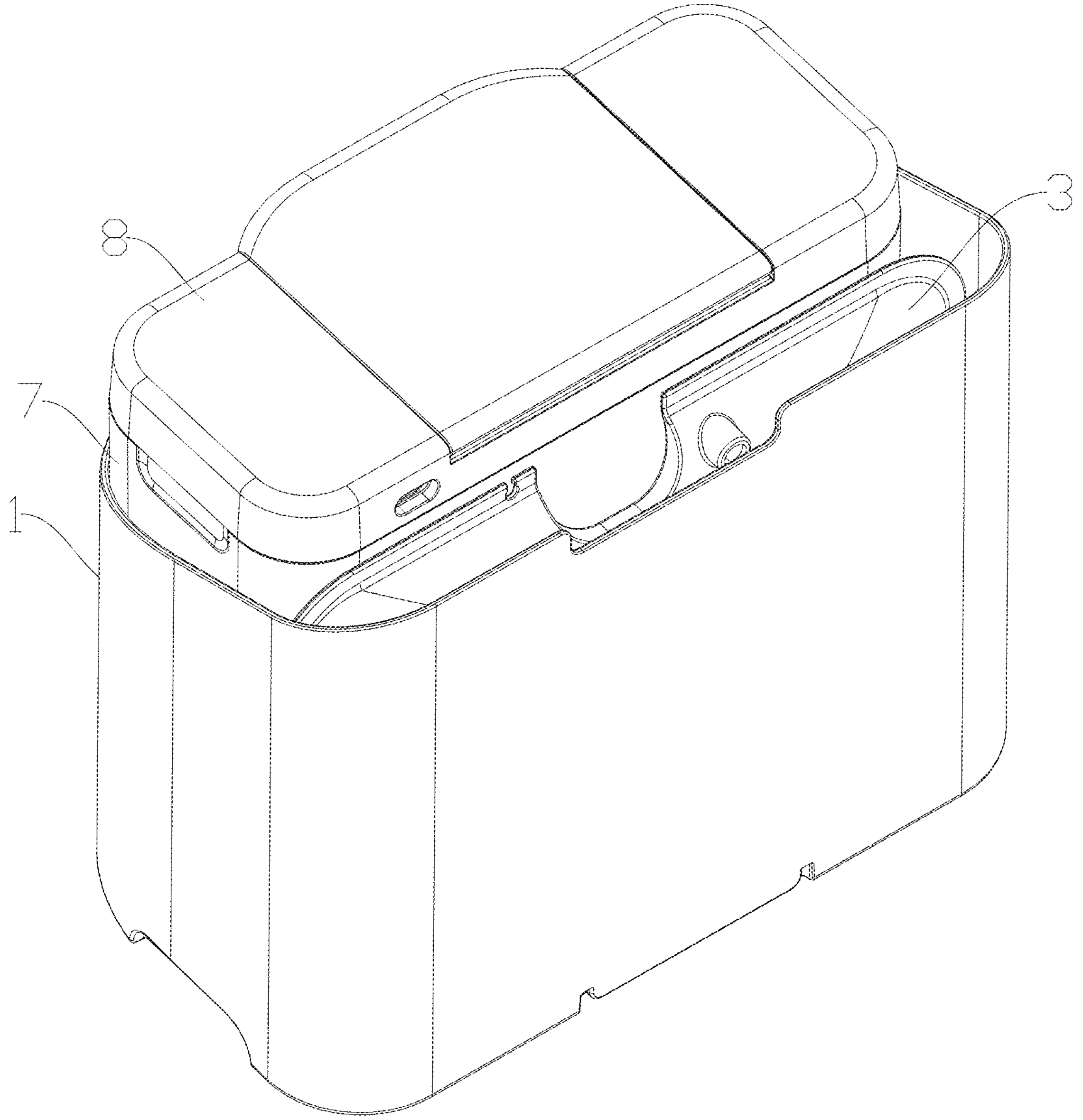
FIG. 1 is a schematic structural diagram of a minimum packaging volume structure for a dual-tank pet water dispenser in Embodiment 1 of the present disclosure.

1: circulating water tank; 101: first water storage chamber; 1011: first upper opening; 2: water tray; 3: filter cartridge tray; 4: first water pump; 401: plug; 5: first water supply pipe; 6: power supply device; 7: purified water tank; 701: second water storage chamber; 7011: second upper opening; 8: upper cover; 9: second water pump; 901: water inlet interface; 10: control board; 11: water outlet structure; 12: second water supply pipe; 13: battery; 14: power supply interface; 15: socket; 16: filter cartridge; and 17: filter cotton.

DETAILED DESCRIPTION OF THE EMBODIMENTS

To make the technical problems to be solved by the present disclosure and the technical solutions and beneficial effects of the present disclosure clearer, the present disclosure will be further described in detail below with reference to the accompanying drawings and the embodiments. It should be noted that similar reference numerals and letters represent similar items in the following accompanying drawings. Therefore, once an item is defined in an accompanying drawing, it is not required to be further defined and explained in the subsequent accompanying drawings. It is hereby declared that the embodiments described below are only used to explain the present disclosure and are not intended to limit the present disclosure.

It should be noted that the terms such as "mount", "dispose", "connection", and "fix" should be understood in a broad sense. For example, it may be a fixed connection, a detachable connection, or being integrated; it may be a mechanical connection or an electrical connection; and it may be being directly connected, being indirectly connected via an intermediate medium, a communication between the interiors of two elements, or an interaction between two elements, unless otherwise expressly limited. The indicated orientations or positional relationships are based on the orientations or positional relationships shown in the accompanying drawings, customary orientations or positional relationships when the product in this application is in use, or orientations or positional relationships customarily understood by those skilled in the art, only for the convenience of describing the present application and simplifying the description rather than indicating or implying that the apparatus or element referred to must have a particular orientation or be constructed and operated in a particular orientation, and therefore cannot be construed as limitations to the present application.

Embodiment 1

Figure 2:
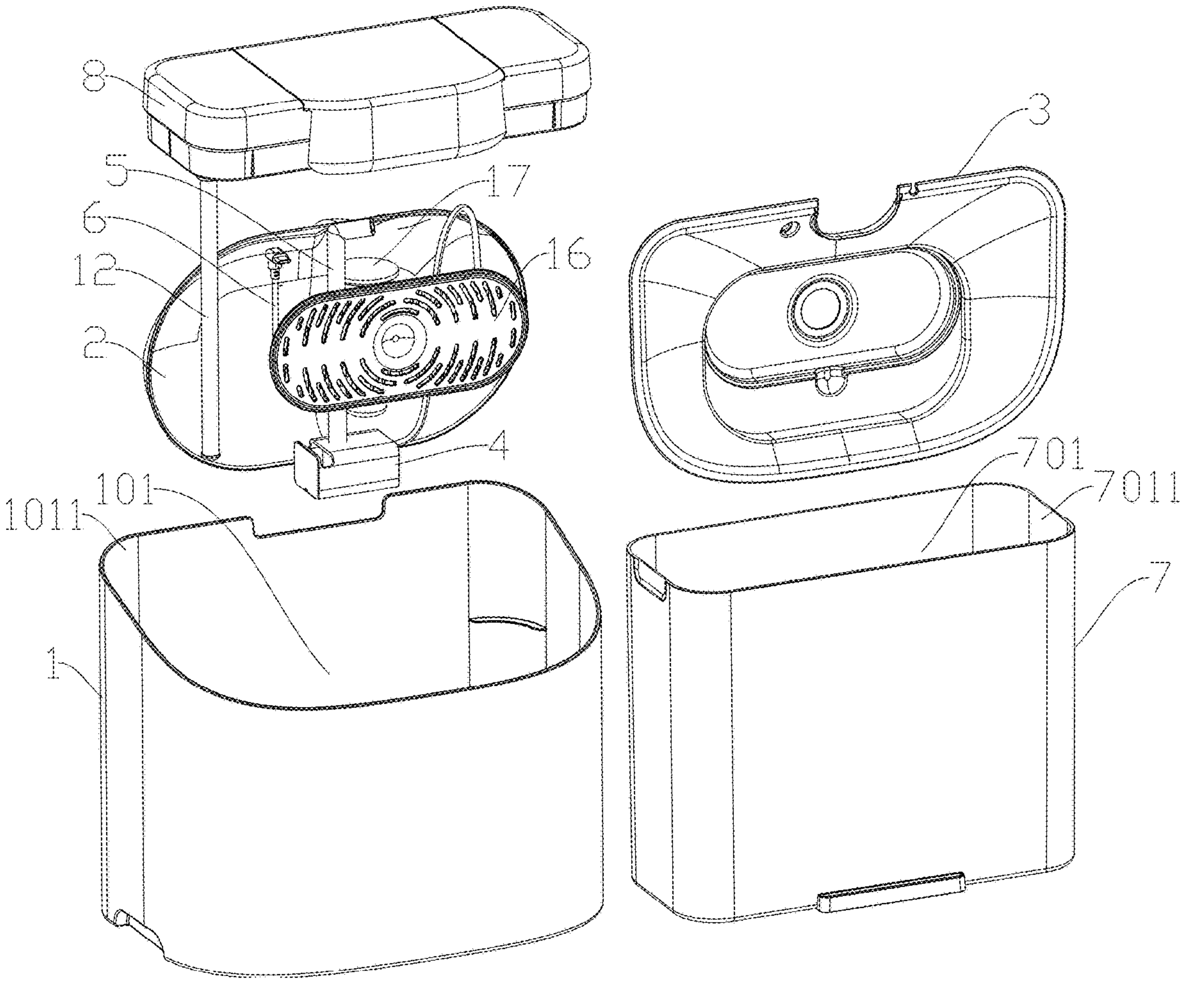
FIG. 2 is an exploded view of a minimum packaging volume structure for a dual-tank pet water dispenser in Embodiment 1 of the present disclosure.

As shown in FIG. 1 and FIG. 2, this embodiment provides a minimum packaging volume structure for a dual-tank pet water dispenser, including: a circulating water tank 1, a water tray 2, a filter cartridge tray 3, a first water pump 4, a first water supply pipe 5, a power supply device 6, a purified water tank 7, and an upper cover 8 that are independently detachable, where the circulating water tank 1 defines a first water storage chamber 101 having a first upper opening 1011, and the purified water tank 7 defines a second water storage chamber 701 having a second upper opening 7011. In a packaged state, the water tray 2, the first water pump 4, the first water supply pipe 5, and the power supply device 6 are accommodated in the second water storage chamber 701, and the second upper opening 7011 is covered by the upper cover 8 to form a purified water tank sealing structure; and the purified water tank sealing structure and the filter cartridge tray 3 are accommodated in the first water storage chamber 101.

Figure 3:
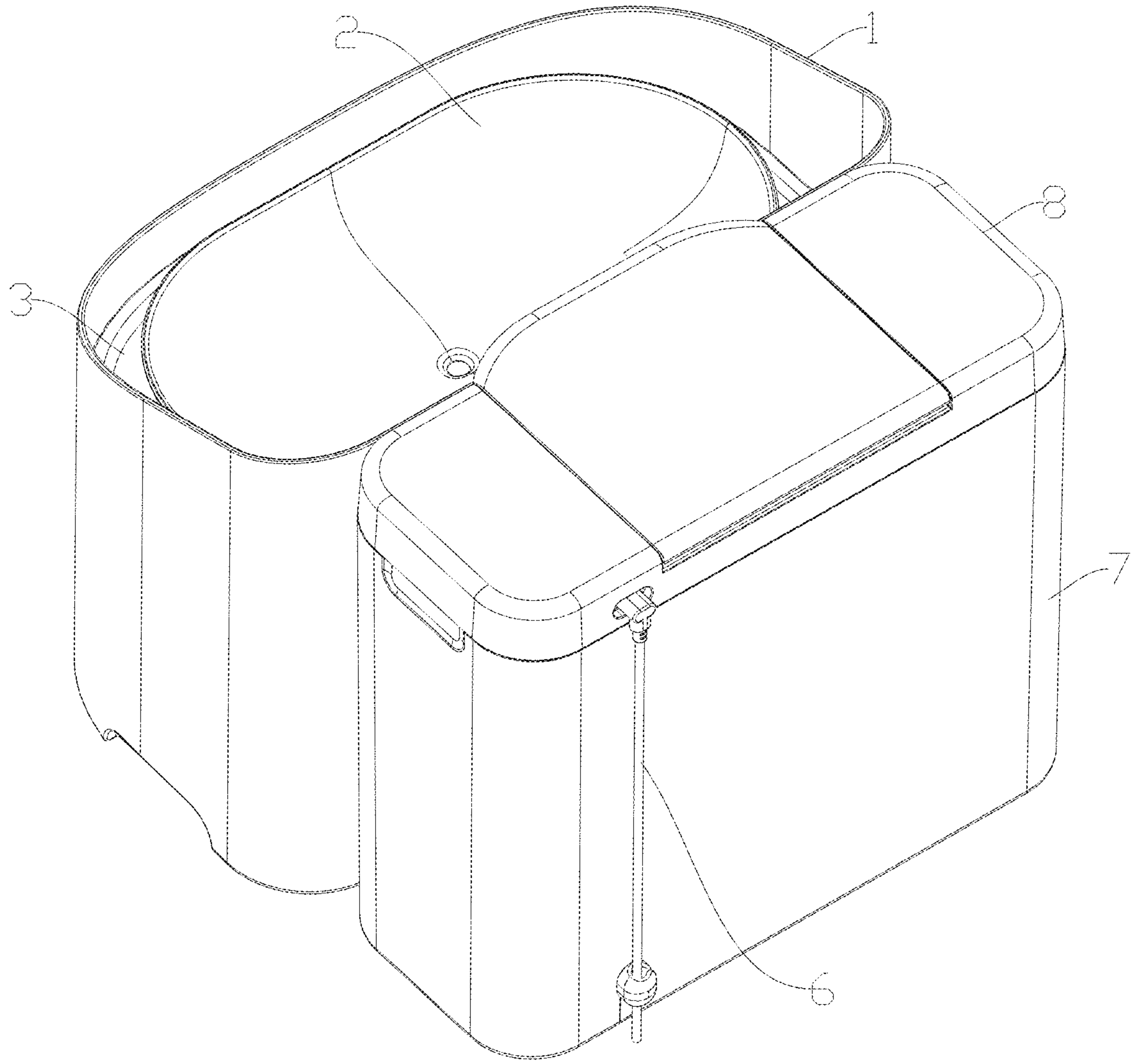
FIG. 3 is a schematic structural diagram of a dual-tank pet water dispenser in Embodiment 1 of the present disclosure.
Figure 4:
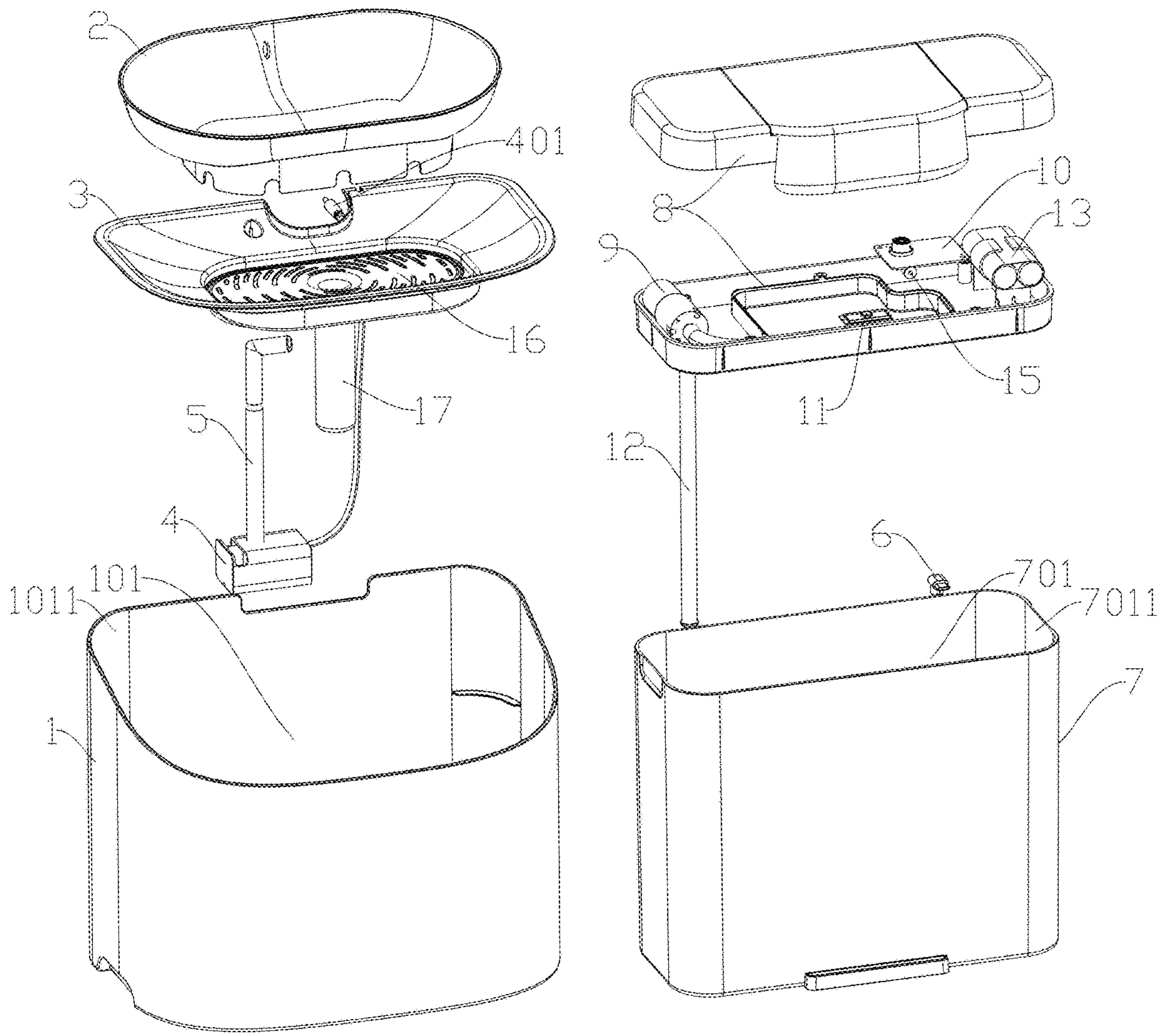
FIG. 4 is an exploded view of a dual-tank pet water dispenser in Embodiment 1 of the present disclosure.
Figure 5:
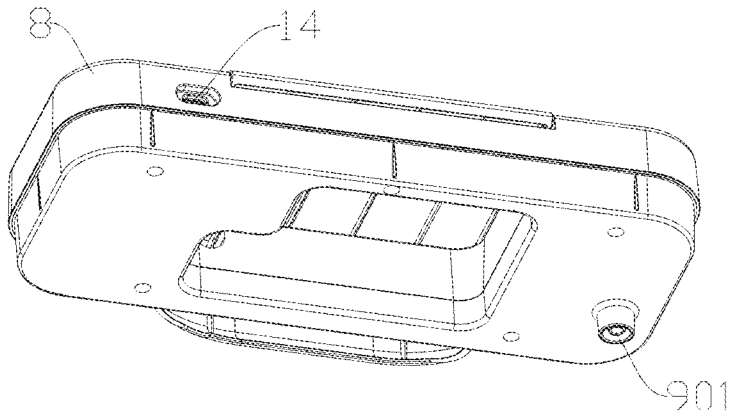
FIG. 5 is a schematic structural diagram of an upper cover in Embodiment 1 of the present disclosure.

As shown in FIG. 3 to FIG. 5, when assembled for use as the dual-tank pet water dispenser, the water tray 2, the filter cartridge tray 3, the first water pump 4, and the first water supply pipe 5 form a water circulation system; after being started, the first water pump 4 can deliver water stored in the first water storage chamber 101 to the water tray 2 via the first water supply pipe 5 and a water outlet hole of the water tray 2, for a pet to drink the water in the water tray 2; and the water in the water tray 2 flows back to the first water storage chamber 101 via a drain hole of the water tray 2 after being filtered by the filter cartridge tray 3. The purified water tank 7 can cooperate with a second water pump 9, a control board 10, and a water outlet structure 11 disposed in the upper cover 8, and a water shortage sensor integrated with the first water pump 4 to form an automatic water refilling system of the circulating water tank 1; and when a water level in the circulating water tank 1 drops to a set threshold, the water shortage sensor is triggered to generate a signal, the control board 10 starts the second water pump 9, and the second water pump 9 pumps water stored in the second water storage chamber 701 to the water outlet structure 11 via the second water supply pipe 12, and delivers the water to the circulating water tank 1 via the water outlet structure 11, thereby achieving unattended continuous water supply. Moreover, a battery 13 is disposed in the upper cover 8, and the upper cover 8 is provided with a power supply interface 14 that mates with the power supply device 6 and a socket 15 that mates with a plug 401 of the first water pump 4. The power supply interface 14 can be connected to mains power via the power supply device 6, thereby achieving mains power supply and charging of the battery 13.

According to the present disclosure, through an innovative nested packaging design, the purified water tank 7 having a small size is accommodated in the circulating water tank 1 having a large size, making full use of an internal space of the circulating water tank 1; moreover, an internal space of the purified water tank 7 can also be fully utilized to accommodate small components of the water circulation system and the small-sized power supply device 6 in the purified water tank 7, greatly reducing a packaging volume. Only one outer packaging box matching the circulating water tank 1 in volume is required to complete packaging, significantly reducing transportation and storage costs.

As shown in FIG. 2, in one embodiment, in the packaged state, a filter cartridge 16 and filter cotton 17 that match the filter cartridge tray 3 can be detached from the filter cartridge tray 3 and, together with the water tray 2, the first water pump 4, the first water supply pipe 5, and the power supply device 6, accommodated in the second water storage chamber 701. By means of centralized storage, the risk of collision and damage to the various components during transportation is reduced, and the overall protection of the product is improved. Moreover, After receiving the product, a user can conveniently take out all the necessary components from the second water storage chamber 701 for assembly, thereby improving the user experience.

In one embodiment, in the packaged state, one end of the first water supply pipe 5 is connected to a water outlet of the first water pump 4, and then the first water supply pipe, together with the power supply device 6 and the filter cotton 17, is packaged in a first packaging bag to form a first packaged assembly; the filter cartridge 16 is individually packaged in a second packaging bag to form a second packaged assembly; the first packaged assembly, the second packaged assembly, and the water tray 2 are together packaged in a third packaging bag to form a third packaged assembly; and the third packaged assembly is accommodated in the second water storage chamber 701. In this embodiment, by packaging the first water supply pipe 5, the power supply device 6, and the filter cotton 17 in the first packaging bag, packaging the filter cartridge 16 in the second packaging bag, and then packaging both together with the water tray 2 in the third packaging bag, classified packaging protection for different components is achieved. This makes the packaging process more organized, thereby improving packaging efficiency, and facilitating subsequent inventory management and shipping operations. Moreover, the multi-layer packaging further reduces collisions and friction between the components during transportation, thereby lowering the product damage rate.

Preferably, the first packaging bag, the second packaging bag, and the third packaging bag are all bubble bags. In a first aspect, the bubble bag has good cushioning performance, which can effectively absorb impact forces during transportation and protect the components from damage. In a second aspect, the bubble bag is light in weight and low in cost, which does not significantly increase the total weight and cost of packaging, and facilitates handling and storage. In a third aspect, the bubble bag is usually made of a recyclable material, which meets environmental protection requirements and is conducive to the sustainable development of enterprises. Certainly, in other embodiments, the first packaging bag, the second packaging bag, and the third packaging bag may also be other packaging bags, such as CPE bags. The present disclosure is not limited thereto.

In one embodiment, in the packaged state, the filter cartridge tray 3 is individually packaged in a fourth packaging bag to form a fourth packaged assembly; the purified water tank sealing structure is individually packaged in a fifth packaging bag to form a fifth packaged assembly; the fourth packaged assembly and the fifth packaged assembly are accommodated in the first water storage chamber 101 to form a packaged combination structure; the packaged combination structure is packaged in a sixth packaging page to form a sixth packaged assembly; and the sixth packaged assembly is packaged in an outer packaging box to form a complete packaging structure. In this embodiment, by individually packaging the filter cartridge tray 3 in the fourth packaging bag, individually packaging the purified water tank sealing structure in the fifth packaging bag, and then combining both with the sixth packaging bag to form the complete packaging structure, comprehensive protection of the product is achieved. The multi-layer packaging makes the packaging structure more compact and stable, thereby improving product integrity during transportation and storage. Moreover, the packaged product is convenient for inventory management and shipping operations, thereby improving logistics efficiency.

Preferably, the fourth packaging bag and the sixth packaging bag are both bubble bags, which can absorb vibration and impact during transportation and provide effective cushioning for the filter cartridge tray 3 and the packaged combination structure; and the fifth packaging bag is a CPE bag, which is soft in texture, dust-proof and moisture-proof, and can protect an exterior surface of the purified water tank sealing structure from scratches or moisture. By selecting packaging bags of different materials for packaging according to the characteristics and protection requirements of different components, more targeted protection is provided. Certainly, in other embodiments, the fourth packaging bag and the sixth packaging bag may also be other packaging bags, such as CPE bags, and the fifth packaging bag may also be any other packaging bag, such as a bubble bag. The present disclosure is not limited thereto.

As shown in FIG. 1, in one embodiment, in the packaged state, the purified water tank sealing structure is longitudinally accommodated in a front area inside the first water storage chamber 101, and the filter cartridge tray 3 is longitudinally accommodated in a rear area inside the first water storage chamber 101, such that the purified water tank sealing structure and the filter cartridge tray 3 are arranged in a compact side-by-side layout in the first water storage chamber 101. In this embodiment, by longitudinally accommodating the purified water tank sealing structure in the front area inside the first water storage chamber 101 and longitudinally accommodating the filter cartridge tray 3 in the rear area inside the first water storage chamber 101, maximum utilization of space is achieved, thereby further reducing the volume of the outer packaging box. The compact side-by-side layout makes the product more stable during transportation and storage, thereby reducing the risk of damage caused by shaking. Moreover, after receiving the product, the user can conveniently take out the purified water tank sealing structure and the filter cartridge tray 3 from the first water storage chamber 101 for assembly, thereby improving user experience and assembly efficiency.

Embodiment 2

Figure 6:
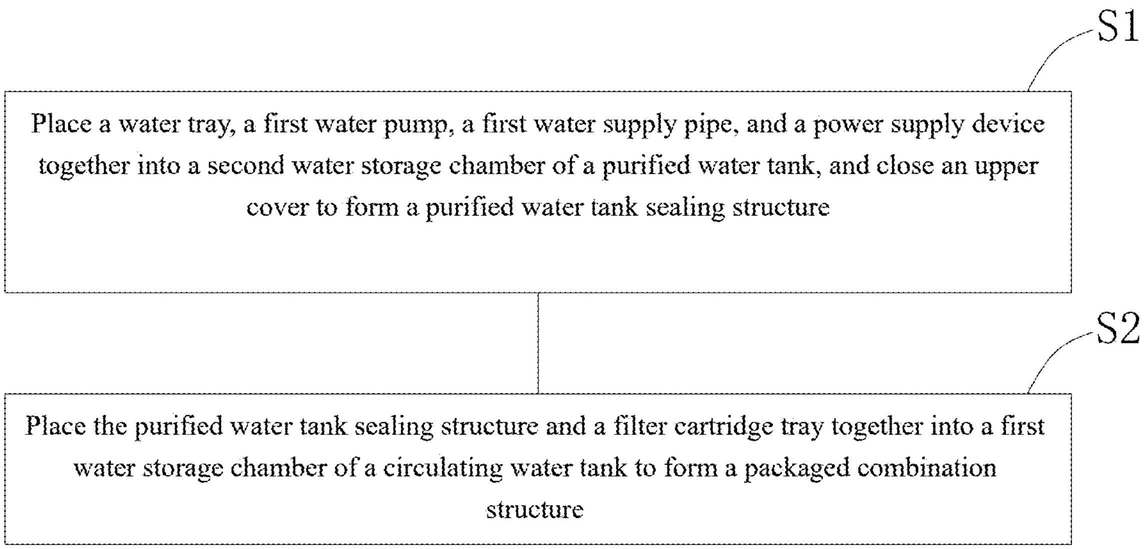
FIG. 6 is a flowchart of a packaging method for a dual-tank pet water dispenser in Embodiment 2 of the present disclosure.

As shown in FIG. 6, the present disclosure provides a packaging method for a dual-tank pet water dispenser, applied to the minimum packaging volume structure for a dual-tank pet water dispenser in Embodiment 1, and including the following steps:

step S1: placing a water tray 2, a first water pump 4, a first water supply pipe 5, and a power supply device 6 together into a second water storage chamber 701 of a purified water tank 7, and closing an upper cover 8 to form a purified water tank sealing structure; and step S2: placing the purified water tank sealing structure and a filter cartridge tray 3 together into a first water storage chamber 101 of a circulating water tank 1 to form a packaged combination structure.

According to the above packaging method for a dual-tank pet water dispenser, the second water storage chamber 701 inside the purified water tank 7 is first used as a storage space to place small components in a centralized manner, which avoids the use of an additional packaging space, effectively reduces the overall packaging size, and improves space utilization. By means of centralized storage of the small components, management and retrieval during packaging, transportation, and storage are facilitated, thereby improving logistics efficiency. Then, the purified water tank sealing structure and the filter cartridge tray 3 having a large size are placed into the first water storage chamber 101 of the circulating water tank 1 to form a relatively complete packaging unit, which is convenient for transportation and storage.

Figure 7:
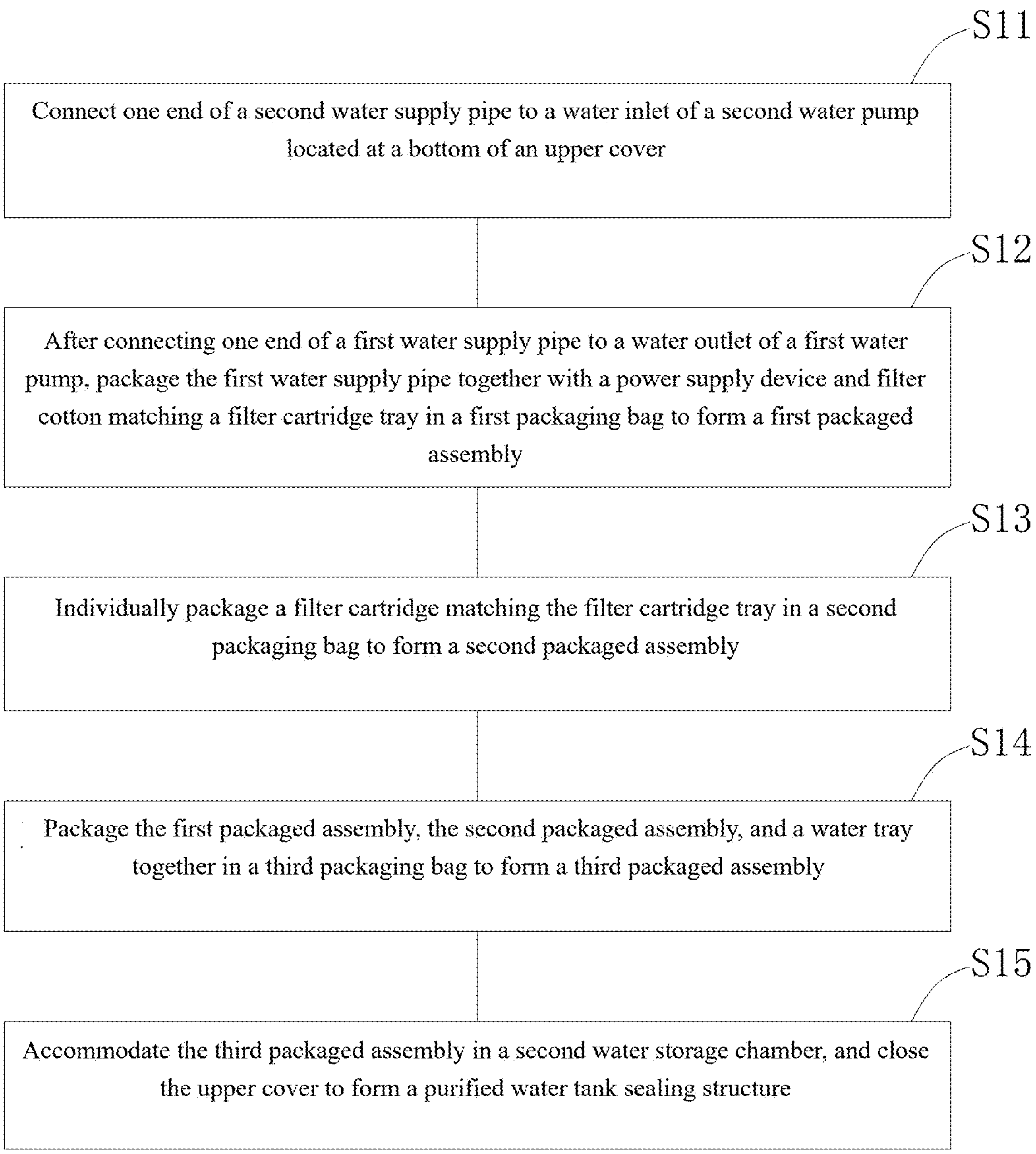
FIG. 7 is a detailed flowchart of step S1 in FIG. 6.

As shown in FIG. 7, in one embodiment, step S1 specifically includes the following sub-steps:

- step S11: connecting one end of a second water supply pipe 12 to a water inlet interface 901 of a second water pump 9 located at a bottom of the upper cover 8, where in this step, the connection between the second water supply pipe 12 and the second water pump 9 is completed in advance during the packaging stage, which reduces mounting steps required by the user upon receipt of the product, and improves user experience; moreover, the second water supply pipe 12 and the second water pump 9 are pre-connected to form an integrated assembly, which prevents the risk of loss caused by mixing the water pipe with other loose components during transportation, and reduces the time for the user to sort and organize the components after opening the box, thereby enhancing the convenience of use;
- step S12: after connecting one end of the first water supply pipe 5 to a water outlet of the first water pump 4, packaging the first water supply pipe together with the power supply device 6 and filter cotton 17 matching the filter cartridge tray 3 in a first packaging bag that is preferably a bubble bag, to form a first packaged assembly;
- step S13: individually packaging a filter cartridge 16 matching the filter cartridge tray 3 in a second packaging bag that is preferably a bubble bag, to form a second packaged assembly;
- step S14: packaging the first packaged assembly, the second packaged assembly, and the water tray 2 together in a third packaging bag that is preferably a bubble bag, to form a third packaged assembly; and
- step S15: accommodating the third packaged assembly in the second water storage chamber 701 of the purified water tank 7, and closing the upper cover 8 to form the purified water tank sealing structure.

In steps S12 to S15 above, the first packaged assembly (the first water supply pipe 5, the first water pump 4, the power supply device 6, and the filter cotton 17) is packaged in the bubble bag, whose a cushioning structure can absorb transportation impacts, protect the first water pump 4 and the power supply device 6 from collision damage, and prevent the filter cotton 17 from fiber shedding due to friction, thereby ensuring a filtration effect. By individually packaging the filter cartridge 16 in a second bubble bag, friction with other components that could cause damage to a filtration layer or leakage of activated carbon and other filter materials is avoided, thereby ensuring the cleanliness and integrity of the filter cartridge 16 at the time of factory shipment. By integrating the first packaged assembly, the second packaged assembly, and the water tray 2 and then packaging them together in a third packaging bag, mutual friction between the components (such as scratching of the second water storage chamber 701 of the purified water tank 7 by the water tray 2) is avoided, and the packaging and sorting process is simplified. Moreover, after integrating the plurality of components, the third packaged assembly has a more regular shape and can tightly fill the second water storage chamber 701 of the purified water tank 7, thereby preventing space waste caused by loose placement of individual components, further compressing the packaging volume, making the purified water tank sealing structure more compact, and reducing the shaking amplitude of the components during transportation.

Figure 8:
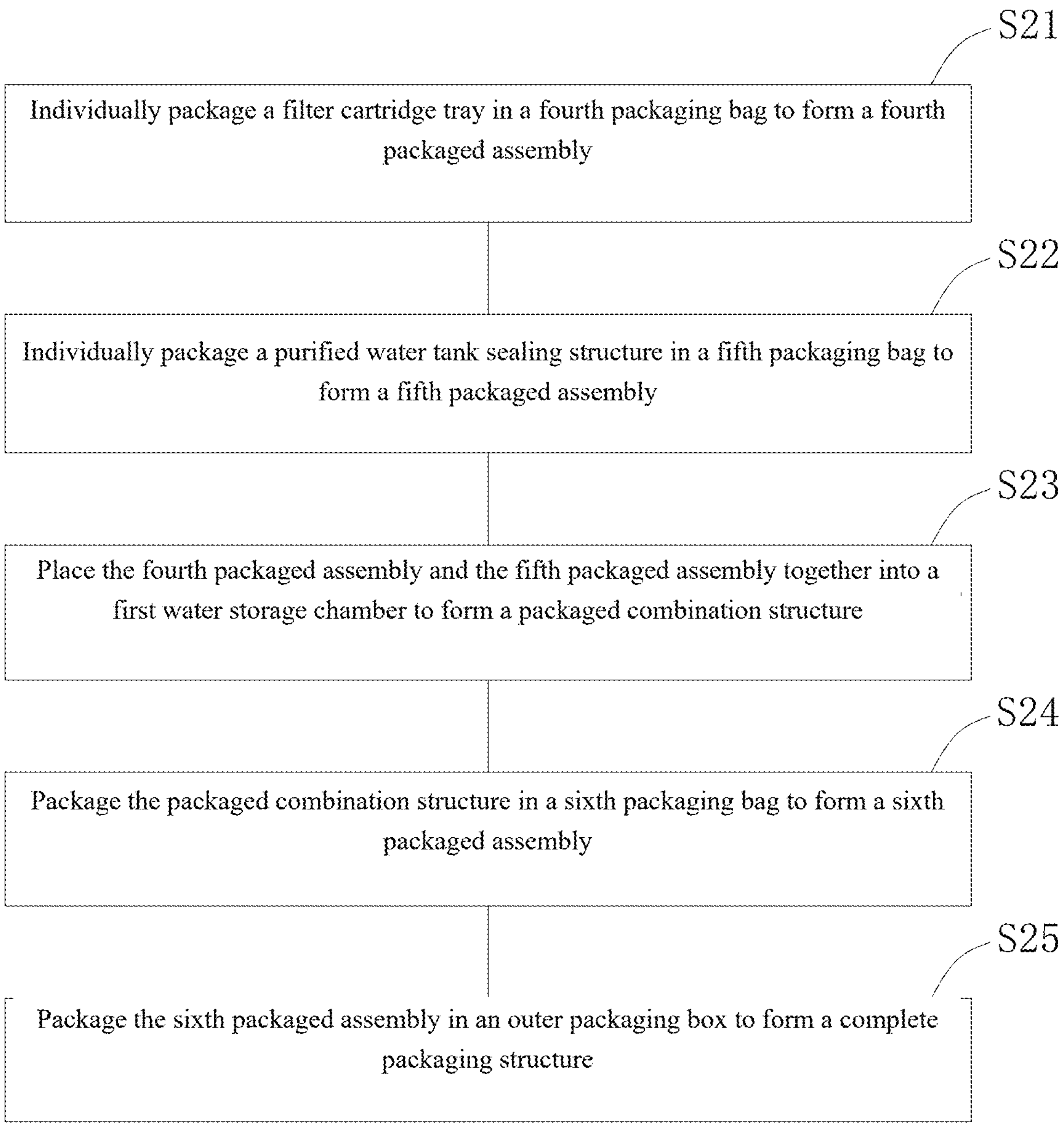
FIG. 8 is a detailed flowchart of step S2 in FIG. 6.

As shown in FIG. 8, in one embodiment, step S2 specifically includes the following sub-steps:

step S21: individually packaging the filter cartridge tray 3 in a fourth packaging bag that is preferably a bubble bag, to form a fourth packaged assembly;

step S22: individually packaging the purified water tank sealing structure in a fifth packaging bag that is preferably a CPE bag, to form a fifth packaged assembly;

step S23: placing the fourth packaged assembly and the fifth packaged assembly together into the first water storage chamber 101 of the circulating water tank 1 to form the packaged combination structure;

step S24: packaging the packaged combination structure in a sixth packaging bag that is preferably a bubble bag, to form a sixth packaged assembly; and step S25: packaging the sixth packaged assembly in an outer packaging box to form a complete packaging structure.

In steps S21 to S25 above, after being respectively individually packaged, the filter cartridge tray 3 and the purified water tank sealing structure are placed together into the first water storage chamber 101 of the circulating water tank 1, thereby fully utilizing the internal space of the circulating water tank 1, avoiding the use of an additional packaging container, reducing the packaging volume, and making the entire package more compact. During transportation and storage, the space can be saved, the transportation and storage costs can be reduced, and the logistics efficiency can be improved. After the components are placed into the first water storage chamber 101 of the circulating water tank 1 to form the packaged combination structure, secondary packaging is performed using the bubble bag, followed by placement into the outer packaging box, thereby forming a complete package with distinct layers and compact structure, which not only facilitates handling and operation, but also allows more products to be accommodated in a limited space, thus improving space utilization. The complete packaging structure forms a relatively independent unit, and the outer packaging box has certain strength and stability, which facilitates handling and loading/unloading during logistics. Whether in a warehouse, a transport vehicle, or a sales terminal, the product can be easily moved and stacked, thereby reducing the possibility of product damage caused by improper handling. The multi-layer packaging structure can adapt to different logistics environments, including long-distance transport, multiple loading/unloading operations, and different climatic conditions. The cushioning, moisture-proof, and dust-proof properties of the bubble bags and the CPE bags, together with the sturdiness of the outer packaging box, provide comprehensive protection for the product, thereby ensuring that the product is not damaged during complex logistics processes and can safely and intactly reach the user.

It should be understood that those of ordinary skill in the art can make improvements or transformations based on the above description, and all such improvements and transformations should fall within the scope of protection of the appended claims of the present disclosure.

The present disclosure is described by way of example above with reference to the accompanying drawings. Obviously, the implementation of the present disclosure is not limited by the above way. As long as various improvements are made using the method concept and technical solutions of the present disclosure, or the concept and technical solutions of the present disclosure are directly applied to other occasions without improvement, they are all within the scope of protection of the present disclosure.

What is claimed is:

1. A minimum packaging volume structure for a dual-tank pet water dispenser, comprising:

a circulating water tank, wherein the circulating water tank defines a first water storage chamber having a first upper opening, and a detachable water circulation system is disposed in the first water storage chamber; and a purified water tank, configured to supply water to the circulating water tank, wherein the purified water tank is accommodated in the first water storage chamber in a packaged state.

2. The minimum packaging volume structure for a dual-tank pet water dispenser according to claim 1, wherein the water circulation system comprises a water tray, a filter cartridge tray, a first water pump, and a first water supply pipe that are independently detachable, the purified water tank defines a second water storage chamber having a second upper opening, the second upper opening is covered by an upper cover, one side of the upper cover is provided with a detachable power supply device, and the purified water tank is capable of cooperating with a second water pump, a control board, and a water outlet structure disposed in the upper cover, and a water shortage sensor integrated with the first water pump to form an automatic water refilling system of the circulating water tank;

in the packaged state, the water tray, the first water pump, the first water supply pipe, and the power supply device are accommodated in the second water storage chamber, and the second upper opening is covered by the upper cover to form a purified water tank sealing structure; and the purified water tank sealing structure and the filter cartridge tray are accommodated in the first water storage chamber.

3. The minimum packaging volume structure for a dual-tank pet water dispenser according to claim 2, wherein in the packaged state, a filter cartridge and filter cotton that match the filter cartridge tray are both accommodated in the second water storage chamber.

4. The minimum packaging volume structure for a dual-tank pet water dispenser according to claim 3, wherein in the packaged state, one end of the first water supply pipe is connected to a water outlet of the first water pump, and then the first water supply pipe, together with the power supply device and the filter cotton, is packaged in a first packaging bag to form a first packaged assembly; the filter cartridge is individually packaged in a second packaging bag to form a second packaged assembly; the first packaged assembly, the second packaged assembly, and the water tray are together packaged in a third packaging bag to form a third packaged assembly; and the third packaged assembly is accommodated in the second water storage chamber.

5. The minimum packaging volume structure for a dual-tank pet water dispenser according to claim 4, wherein in the packaged state, the filter cartridge tray is individually packaged in a fourth packaging bag to form a fourth packaged assembly; the purified water tank sealing structure is individually packaged in a fifth packaging bag to form a fifth packaged assembly; and the fourth packaged assembly and the fifth packaged assembly are accommodated in the first water storage chamber to form a packaged combination structure.

6. The minimum packaging volume structure for a dual-tank pet water dispenser according to claim 5, wherein in the packaged state, the packaged combination structure is packaged in a sixth packaging bag to form a sixth packaged assembly; and the sixth packaged assembly is packaged in an outer packaging box to form a complete packaging structure.

7. The minimum packaging volume structure for a dual-tank pet water dispenser according to claim 2, wherein in the packaged state, the purified water tank sealing structure is longitudinally accommodated in a front area inside the first water storage chamber, and the filter cartridge tray is longitudinally accommodated in a rear area inside the first water storage chamber, such that the purified water tank sealing structure and the filter cartridge tray are arranged in a compact side-by-side layout in the first water storage chamber.

8. A packaging method for a dual-tank pet water dispenser, applied to the minimum packaging volume structure for a dual-tank pet water dispenser according to claim 2, and comprising the following steps:

step S1: placing a water tray, a first water pump, a first water supply pipe, and a power supply device together into a second water storage chamber of a purified water tank, and closing an upper cover to form a purified water tank sealing structure; and step S2: placing the purified water tank sealing structure and a filter cartridge tray together into a first water storage chamber of a circulating water tank to form a packaged combination structure.

9. The packaging method for a dual-tank pet water dispenser according to claim 8, wherein step S1 specifically comprises the following sub-steps:

step S11: connecting one end of a second water supply pipe to a water inlet of a second water pump located at a bottom of the upper cover;

step S12: after connecting one end of the first water supply pipe to a water outlet of the first water pump, packaging the first water supply pipe together with the power supply device and filter cotton matching the filter cartridge tray in a first packaging bag to form a first packaged assembly;

step S13: individually packaging a filter cartridge matching the filter cartridge tray in a second packaging bag to form a second packaged assembly;

step S14: packaging the first packaged assembly, the second packaged assembly, and the water tray together in a third packaging bag to form a third packaged assembly; and step S15: accommodating the third packaged assembly in the second water storage chamber, and closing the upper cover to form the purified water tank sealing structure.

* * * * *